(12) United States Patent
Gutierrez Vesga

(10) Patent No.: US 6,652,410 B2
(45) Date of Patent: Nov. 25, 2003

(54) CONTINUOUS TORQUE REGULATOR

(76) Inventor: Eduardo Gutierrez Vesga, Calle de Enmedio, E-09249, Vileña de Bureba (ES)

(*) Notice: Subject to any disclaimer, the term of this patent is extended or adjusted under 35 U.S.C. 154(b) by 0 days.

(21) Appl. No.: 10/089,745
(22) PCT Filed: May 30, 2001
(86) PCT No.: PCT/ES01/00218
  § 371 (c)(1),
  (2), (4) Date: Apr. 3, 2002
(87) PCT Pub. No.: WO02/14713
  PCT Pub. Date: Feb. 21, 2002

(65) Prior Publication Data
  US 2002/0151403 A1 Oct. 17, 2002

(30) Foreign Application Priority Data
  Aug. 8, 2000 (ES) .......................... 200002025

(51) Int. Cl.[7] .................... F16H 3/44; F16H 47/08
(52) U.S. Cl. ......................... 475/290; 475/91
(58) Field of Search ................ 475/31, 36, 42, 475/83, 91, 282, 290, 317

(56) References Cited

U.S. PATENT DOCUMENTS

| | | | |
|---|---|---|---|
| 2,332,436 A | 10/1943 | Campbell | |
| 3,006,217 A | * 10/1961 | Dodge | 475/42 X |
| 3,893,352 A | 7/1975 | Cotton | |
| 4,192,201 A | * 3/1980 | McCoin | 475/91 X |
| 4,255,987 A | 3/1981 | Ciolli | |
| 4,271,725 A | * 6/1981 | Takao et al. | 475/83 |
| 5,472,382 A | 12/1995 | Aramendia | |

FOREIGN PATENT DOCUMENTS

| | | |
|---|---|---|
| GB | 2 179 412 | 3/1987 |
| WO | WO 98/23880 | 6/1998 |

* cited by examiner

Primary Examiner—Roger Pang
(74) Attorney, Agent, or Firm—Collard & Roe, P.C.

(57) ABSTRACT

Continuous torque regulator formed by a transmission system and a regulating circuit, wherein the transmission system is formed by three epicycloid gears, in which each one is formed by a planetary gear, a series of satellite pinions and a crown wheel, wherein the second and third planetary gears are rigidly joined, and the satellite gears of the third train are double, the regulating circuit having a pressure pump (Bp) which is joined by means of a pinion to the crown wheel (C1), a control valve (Vc) which is joined by means of a pinion to the shaft of the planetary gear (A1) and a valve (N) which in the event of being actuated torque transmission ceases, the assembly permitting the regulation of torque in a continuous form without steps and without any need for interruption mechanisms, it being possible to interrupt the transmission at will.

9 Claims, 6 Drawing Sheets

CONTINUOUS TORQUE REGULATOR

CROSS REFERENCE TO RELATED APPLICATIONS

Applicant claims priority under 35 U.S.C. §119 of Spanish Application No. P 200002025, filed on Aug. 8, 2000. Applicant also claims priority under 35 U.S.C. §120 of PCT/ES01/00218, filed on May 30, 2001. The international application under PCT article 21(2) was not published in English.

OBJECT OF THE INVENTION

The object of the invention proposed herein refers to a continuous torque regulator which is an assembly of mechanisms the purpose of which is to implement a regulation of the torque in a continuous manner, that is without jumps or steps, in other words it is not discrete in form, wherein said regulation is implemented between two values, between zero torque and calculated maximum torque.

Among the applications for continuous torque regulators is that of replacing clutches and gearboxes in transport vehicles like motor cars and trucks, being applicable in the machinery of heavy vehicles like tractors, civil works machinery like cranes and excavators, and in all those machines in which the torque to be applied has to be matched to an end job to be carried out. It is of special interest for those cases where the torque is applied in a manner that is not constant but variable and has to be applied in a form that is continuous and without steps.

Thus the present invention falls within the scope of the mechanisms for machines that have to apply a torque and more specifically within the scope of the continuous torque regulators.

BACKGROUND TO THE INVENTION

Up to the present time, torque regulators are based on systems of clutches, converters and other couplings with all their actuating systems (pedals, levers, etc.). All these systems have the drawback of being of low efficiency and make poor use of the input torque, and also are limited to the torque to be transmitted and do not permit the torque to amplified to a sufficient degree.

Hence the objective of the present invention is to overcome the foregoing drawbacks, achieving a torque transmission system which has a high efficiency and can be used to regulate high torque values, as well as to amplify the input torque in a sufficient manner, and in which said system does not require mechanisms to interrupt the transmission of torque in order to carry out actions such as increasing, diminishing or halting the transmission of torque, as well as having a final direction of rotation the same as or opposite to that of the input, it being possible to interrupt at will independently of the regulation which is being performed at the time and in which the transmission of torque is continuous by design, although the operation may be carried out in a stepped manner, and which as a result permits a better use of the final available power.

DESCRIPTION OF THE INVENTION

The proposed invention of a continuous torque regulator consists of a mechanism based on a series of epicycloid gears. An epicycloid gear mechanism is formed by a pinion termed planetary gear which engages with two or three pinions arranged on its circumference, which are given the name of satellite pinions. The driving shafts of the satellite pinions are joined to each other through a frame in such a manner that the relative position is maintained of the three satellite pinions. These satellite pinions are located inside a crown wheel which, toothed on the inside, engages with these satellite pinions.

The continuous torque regulator assembly is formed by three epicycloid gears in which the first and second epicycloid gears are tied by means of a frame which joins the shafts of the satellite gears of the epicycloid gears. The third gear likewise has a planetary gear, but which in this case is joined to the planetary gear of the second epicycloid gear. This third gear also has satellite gears but with the particularity that they are double pinions in a single body, in which the larger pinion is that which engages with the planetary gear. The shafts of these gears are joined to each other by means of a frame which, at the same time, is the frame which ties the satellite pinions of the second and of the third gears, the entire assembly being enclosed by a crown wheel which encloses the double satellite pinions but which engages with the smaller of the satellites.

On the shaft which drives the planetary gear of the first epicycloid gear is mounted a pinion which serves to transmit the motion to the control valve. In turn, on the crown wheel of the first epicycloid gear, is mounted another pinion which serves to transmit the motion to the pressure pump.

On the outside face of the crown wheels of the second and third epicycloid gears are grooves such that by means of mechanisms which can be inserted at will, it is possible to stop one or the other of the two crown wheels can be achieved.

DESCRIPTION OF THE DRAWINGS

Further characteristics and benefits of the present invention shall become more clear in the following detailed description of the preferred embodiment, made with reference to the drawings attached, in which.

PREFERRED EMBODIMENT OF THE INVENTION

Figure 1:
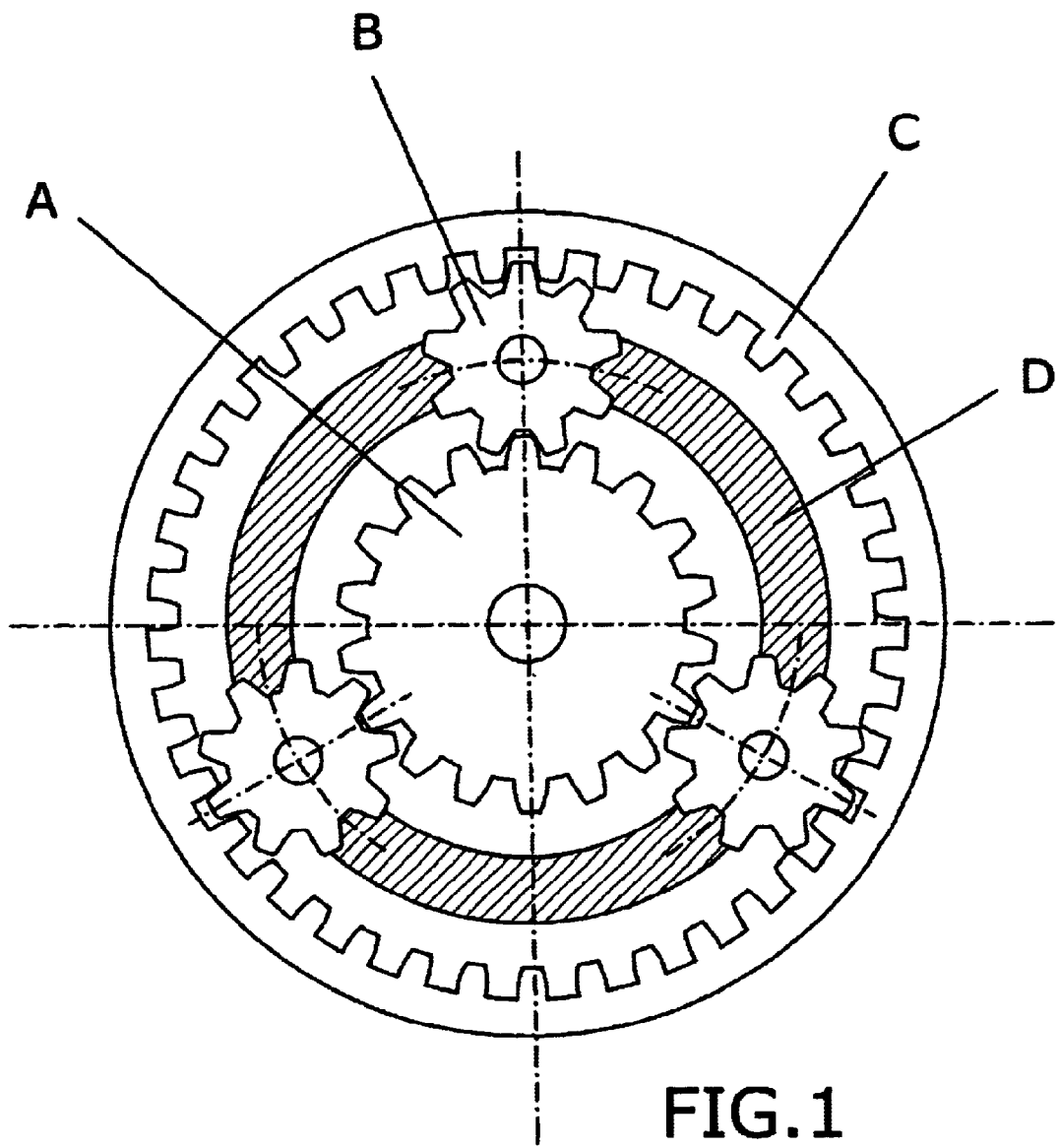
FIG. 1.—Shows a representation of an epicycloid gear.

With reference to the foregoing figures, it can be seen from FIG. 1 how an epicycloid gear is formed, the same consisting of a planetary gear (A) on which is arranged each of the satellite pinions (B) and around these a crown wheel (C) which internally meshes with the satellite pinions (B). The relative position of said satellite pinions (B) is maintained thanks to the shafts thereof being joined by means of a frame (D).

Figure 2:
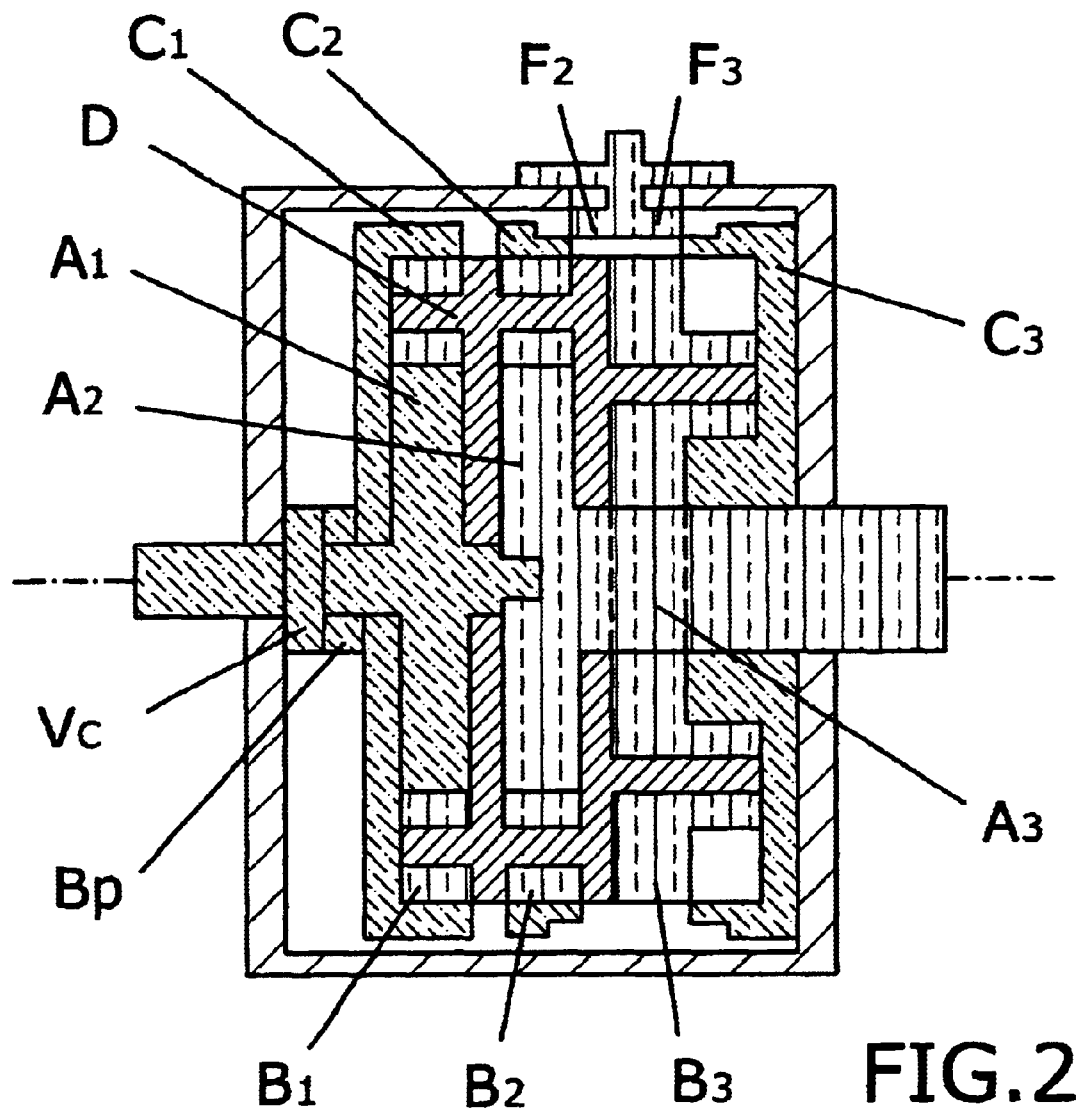
FIG. 2.—Shows the torque transmission system of the continuous torque regulator.

In FIG. 2 can be seen how the transmission system of the regulator mechanism is formed, the same being formed by three epicycloid gears. The first gear is formed by a planetary gear (A1) on which are arranged some satellite pinions (B1) which are meshed with the inner part of a crown wheel (C1) mounted externally. The second epicycloid gear is likewise formed by a planetary gear (A2) on which are arranged some satellite pinions (B2) which are engaged on the inner part of a crown wheel (C2). The first and the second gears are tied by the frame that joins the shafts of the satellite pinions. The third gear is formed by a planetary gear (A3) which is united with the planetary gear (A2) of the second epicycloid gear, also having satellite pinions (B3) but in this case the pinions are double pinions in a single body, in such a manner that the larger part of the satellite pinions (B3) is that which engages with the planetary gear (A3), whilst the smaller part of the satellite pinions (B3) is that which engages with the crown wheel (C3) and which is extended radially to form a plate.

On the shaft which drives the planetary gear (A1) is mounted a pinion (Vc) which serves to transmit the motion to the control valve. On the crown wheel (C1) is mounted another pinion (Dp) which serves to transmit the motion to the pressure pump.

It can be observed that on the outside part of each of the crown wheels (C2) and (C3) are grooves into which the pieces (F2) and (F3) can be inserted at will since the latter are joined to the casing that encloses the transmission system, blocking and halting said crown wheels.

Figure 3:
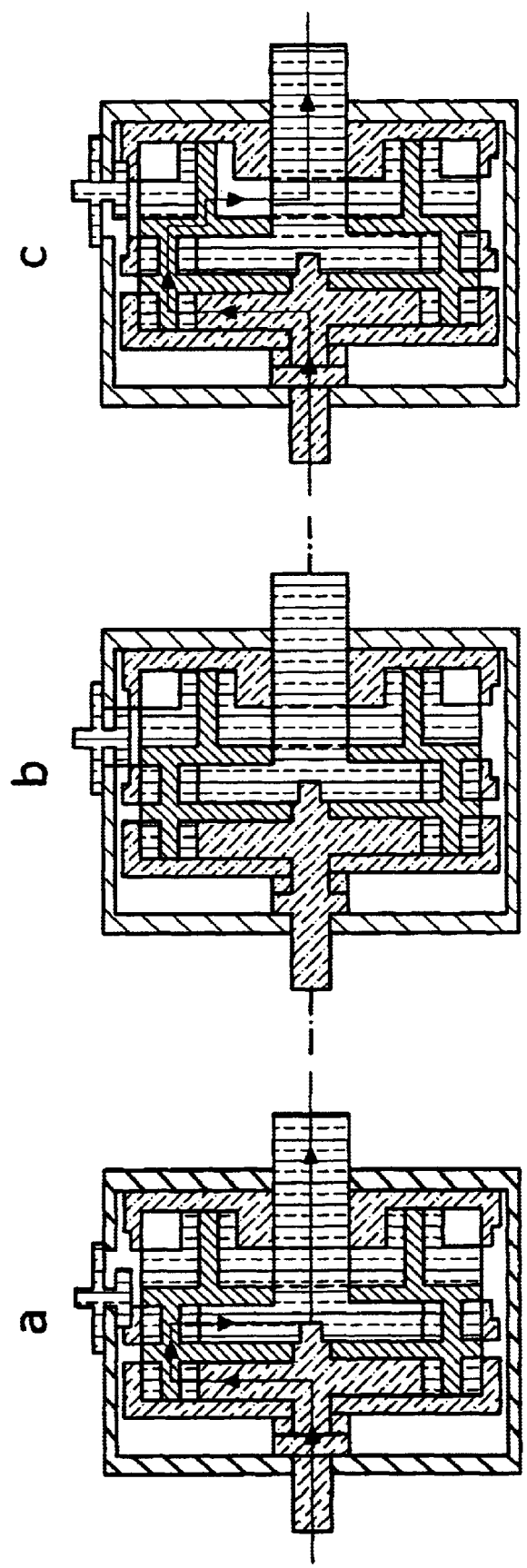
FIG. 3.—Shows the continuous torque regulator and the path followed in the transmission of the motion.

In FIG. 3 can be seen the different paths that the motion can follow in which in condition a) the input and the output have the same direction of rotation, in b) the transmission is interrupted and in c) the direction of rotation is reversed. Whether the direction of rotation is the same or reversed, depends on how the mechanisms (F2) and (F3) are arranged. It is pointed out that it is not possible to carry out simultaneous blocking of the crown wheels (C2) and (C3) since, if this occurred, blocking of both would take place and as the directions of rotation are opposite, the mechanism would be destroyed.

When the motion reaches the shaft of the planetary gear (A1), the latter transmits the motion to the satellite pinions (B1) and, since the crown wheel (C1) engages with satellite pinions (B1) and is governed by the pinion that joins it to the pressure pump, two situations can arise:

a) The crown wheel (C1) turns freely moved by the satellite pinions (B1) whereby the frame which supports said pinions (B1) remains still and does not pass the motion to the other gear trains.

b) The crown wheel (C1) can turn more or less quickly or be completely stopped, whereby the satellite gears (B1) shall run on the inside of the crown wheel (C1) driving the frame (D) which supports them.

Then the motion transmitted through the frame (D) reaches the second and third epicycloid gears, in which case three different situations can arise:

the first: that the crown wheel (C2) is halted by the mechanism (F2), in which case the satellite pinions (B2) run on the inside, transmitting the motion to the planetary gear (A2). The shaft that drives the planetary gear (A2) shall rotate in the same direction as the planetary gear (A1). In addition, the motion reaches the third epicycloid gear from two sides, via the frame that unites the satellite pinions (B1) and (B3) and via the planetary gear (A2) since its shaft is firmly joined to the shaft of the planetary gear (A3), and, since the crown wheel (C3) can rotate freely, the entire train shall turn without affecting its transmission system. The output rotation is in the same direction as the input rotation.

The second situation that can occur is that of the third crown wheel (C3) having its rotation blocked by the mechanism (F3), in which case the crown wheel (C2) has to turn freely. The motion is applied to the third epicycloid gear through the frame which holds the satellite pinions (B3). As satellite pinion (B3) is double and it is the smaller part which engages with the crown wheel (C3) which is blocked, then the rotation of said pinion (B3) occurs which, by having its larger part engaged with the planetary gear (A3), causes the latter to rotate, which in this case is in the opposite direction. Under these circumstances the second epicycloid gear, by having the crown wheel (C2) free, does not interfere with the motion of the third gear.

The third situation is that in which both crown wheel (C2) and crown wheel (C3) rotate freely, in which case the motion to the second and third epicycloid gears arrives via the frame (D), the planetary gears (A2) and (A3) being stopped due to the inherent resistance of the output shaft. Given that crown wheels (C2) and (C3) are free, each satellite and crown of the epicycloid trains shall rotate as per its design but shall not transmit any motion to the output shaft.

Figure 4:
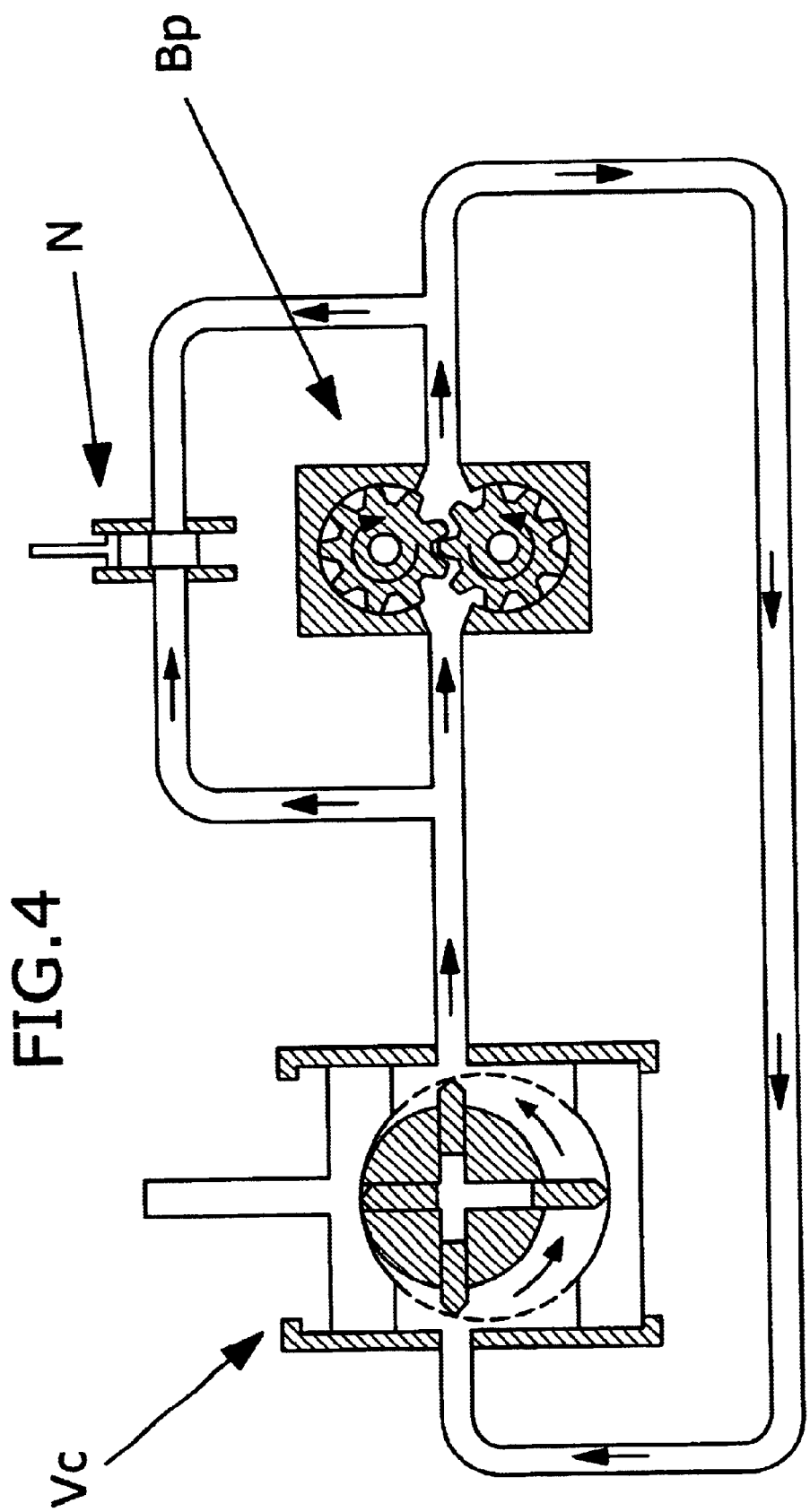
FIG. 4.—Shows the operating principle of the continuous torque regulator system.

From FIG. 4 it can be seen how the continuous torque regulator system is comprised of:

Pressure pump (Bp) which is moved by the crown wheel (C1), is formed of two gear assemblies which engage with each other and has an inlet and an outlet orifice.

Control valve (Vc) which is a rotor with some longitudinally milled grooves wherein the blades of said rotor have some elastic elements mounted inside them which push the blades outwards. The rotor, together with its vanes, are housed inside a circular chamber and can be moved at will. The control valve is moved by the shaft that drives the planetary gear (A1) of the first epicycloid gear.

Hydraulic circuit which is formed by a series of channels that connect the control valve (Vc) with the pressure pump (Bp), there being a bypass on the pressure pump (Bp) which is actuated by the valve (N).

The regulation process consists in making the operation of the pressure pump (Bp) vary and therefore that of the crown wheel (C1) of the first epicycloid gear. When the motion reaches the shaft of the planetary gear (A1), said motion is transmitted to the satellite gears (B1) which, in turn, transmit it to the crown wheel (C1) and the latter to the pressure pump (Bp). The pressure pump (Bp) drives the oil to the control valve (Vc) in order that it move the shaft of the planetary gear (A1), that is, it behaves like a valve that once again transfers the oil to the pressure pump (Bp). If the control valve (Vc) transfers the same oil to the pressure pump (Bp) then the crown wheel (C1) rotates freely.

As the circular chamber of the control valve can be made to vary by displacing it with respect to the rotor, then an eccentric cavity can be established, whereby the quantity of oil is altered that is transferred to the pressure pump (Bp). Thus, if the circular chamber of the control valve (Vc) is displaced towards the centre, the oil flowing to the pressure pump (Bp) is less, therefore the latter shall rotate more slowly and consequently the crown wheel (C1), for which reason the satellite pinions (B1) shall be compelled to run on its inside displacing the frame (D) which is the element that transmits the motion to the other epicycloid gears. In the degree that the circular chamber of the control valve (Vc) is brought closer to the centre of its rotor, the slower shall the pressure pump (Bp) and the crown wheel (C1) turn, whilst the frame (D) which holds the satellite pinions (B1) shall, on the contrary, turn faster.

If the circular chamber of the control valve (Vc) is moved to the centre, no oil is allowed to pass and therefore the pressure pump (Bp) is unable to impel any oil and is stopped together with the crown wheel (C1), it being the satellite pinions (B1) which by means of the frame (D) transmit the motion to the other gears. In the event that valve (N) is open, a bypass is formed such that the pressure pump (Bp) turns freely without there being any torque transmitted, it being possible to actuate this valve at will during any of the regulation phases.

Figure 5:
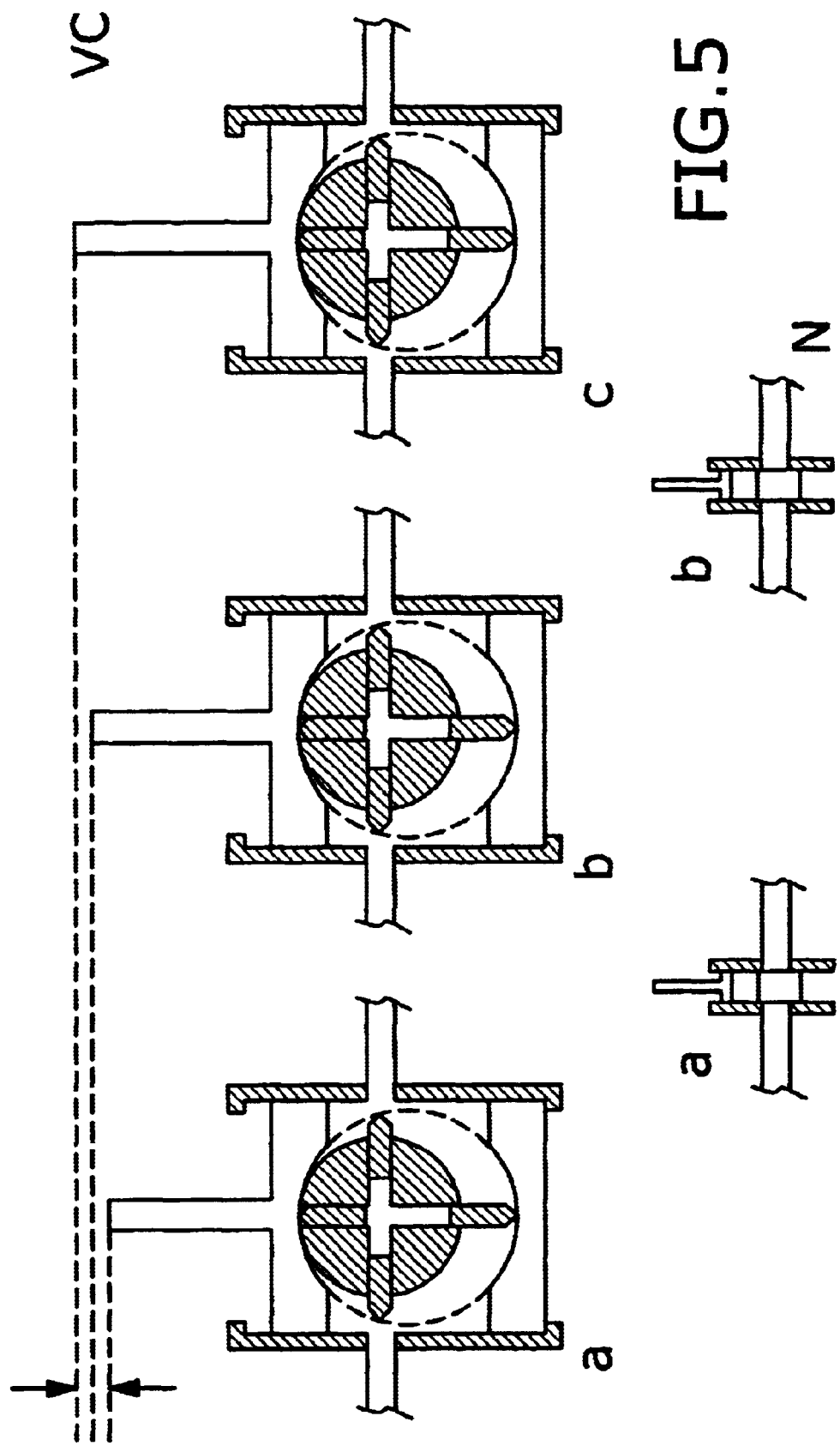
FIG. 5.—Shows the regulating process of the control valve and the pressure pump bypass valve.

In FIG. 5 can be seen the control valve (Vc) and the different positions it can adopt, in which:

Position a) is that which permits maximum passage of oil.

Position b) is an intermediate position.

And position c) in which the circular chamber in which the rotor and its vanes are housed is in a central position and impedes the passage of oil.

In the lower part can be seen the open and closed position of the bypass valve (N).

Figure 6:
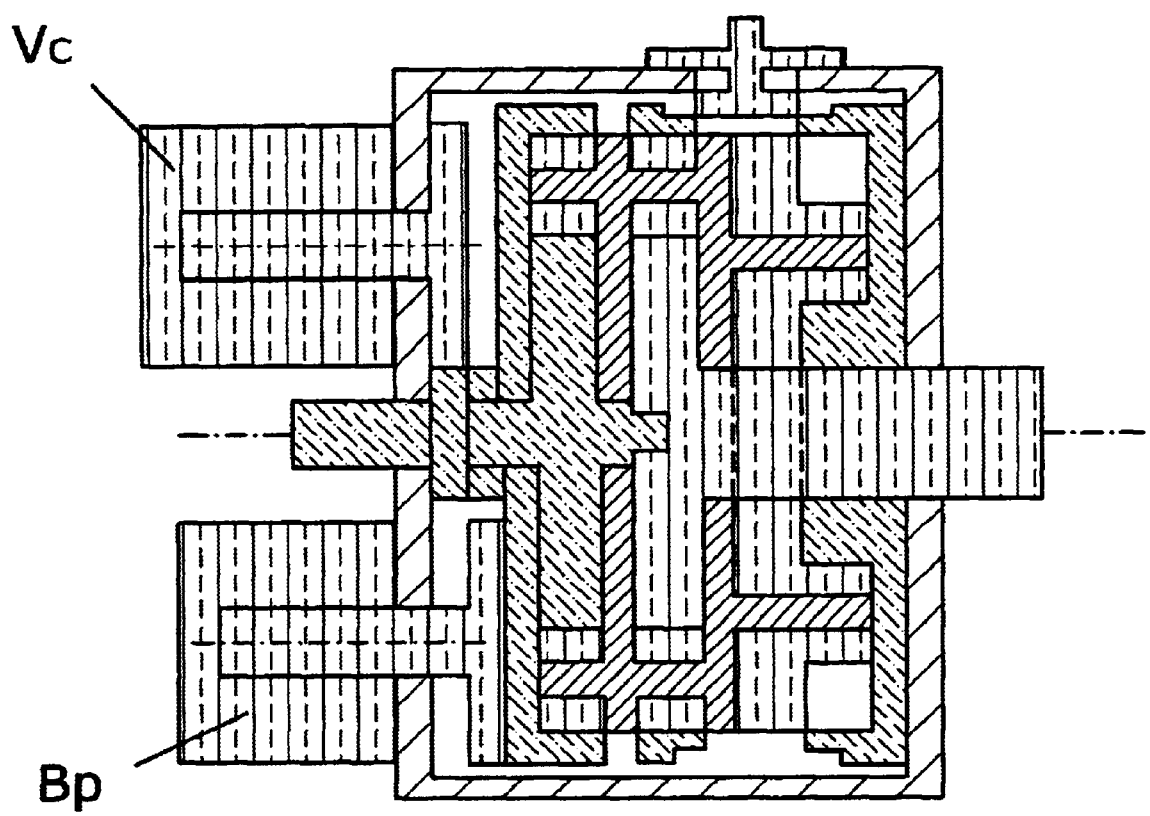
FIG. 6.—Shows the mechanical links between the pressure pump and control valve with the transmission system.

FIG. 6 shows how the mechanical link is formed of the control valve (Vc) and the pressure pump (Bp) with the transmission system for which use is made of each of the pinions mounted on the shaft of the planetary gear (A1) and of the crown wheel (C1) respectively.

The invention, within its essential nature, can be implemented in practice in other forms of embodiment which differ in detail from that indicated by way of example in the description, and which shall likewise be covered by the protection claimed. Likewise it can be constructed in any form and size with the most appropriate materials and still remain within the spirit of the claims.

What is claimed is:

1. Continuous torque regulator, characterized in that it permits interruption of the torque at will, a direction of rotation at the output can be the same as or opposite to that of the direction of the input and in which the torque regulation is continuous and free of steps being constituted by a transmission system and a regulation system, in which the transmission system comprises three epicycloid gear sets, in which the first gear set has a first planetary gear (A1) on which are arranged first satellite pinions (B1) which maintain their relative position upon a frame (D), and which engage a first crown wheel (C1) on its inside part, the second gear set has a second planetary gear (A2), second satellite pinions (B2) and a second crown wheel (C2) while the third gear set consists of a third planetary gear (A3) firmly joined to said second planetary gear (A2), having satellite double pinions (B3) which in their broader part engage with said third planetary gear (A3) and in their narrower part engage with a third crown wheel (C3), wherein a pinion which transmits motion to a control valve (Vc) is mounted on a shaft connected to the first planetary gear (A1), while another pinion located on the first crown wheel (C1) transmits motion to a pressure pump (Bp); on the outside surface of each of the second (C2) and third (C3) crown wheels, recesses are formed for first (F2) and second (F3) mechanisms, and in which the torque regulation system is formed by said pressure pump (Bp), said control valve (Vc) and another valve (N).

2. Continuous torque regulator, in accordance with claim 1, characterized in that said first (F2) and second (F3) mechanisms can be inserted into the recesses of said second (C2) and third (C3) crown wheels to halt and block said crown wheels, on condition that the two crown wheels must never be blocked simultaneously since in such an event the mechanism is destroyed.

3. Continuous torque regulator, in accordance with claim 1, characterized in that the pressure pump (Bp) of the regulation system is formed by two pinions which engage with each other and are enclosed in a casing which has an inlet orifice and an outlet orifice, being moved by the first crown wheel (C1) of the first epicycloid gear set.

4. Continuous torque regulator, in accordance with claim 1, characterized in that the control valve (Vc) of the regulation system is formed by a rotor on which are mounted blades which by means of elastic elements, push the blades outwards, and in which a circular chamber can be moved at will in a direction transversal to the rotor, the control valve (Vc) being moved by the first planetary gear (A1) by means of said pinion.

5. Continuous torque regulator, in accordance with claim 1, characterized in that said other valve (N) is mounted in a bypass or bridging form on the pressure pump (Bp) such that on being actuated, the pressure pump can turn freely without torque being transmitted, and can be actuated at will during any regulation phase.

6. Continuous torque regulator, in accordance with claim 1, characterized in that a hydraulic circuit of the regulation system of the torque regulator is formed by a series of channels that connect the control valve (Vc) with the pressure pump (Bp), there being a bypass for the pressure pump (Bp), implemented by means of said other valve (N), and wherein the hydraulic circuit can be filled with any liquid.

7. Continuous torque regulator, in accordance with claim 1, characterized in that in the event that the first crown wheel (C1) turns more or less quickly due to the regulation system, then in the event that the second crown wheel (C2) is blocked, the motion reaching the second gear set via the frame (D) and via the second planetary gear (A2) which is firmly joined to the third planetary gear (A3), the direction of rotation of the output shall be the same as that of the input, while if the third crown wheel (C3) is blocked, then the motion reaches the third gear set via the frame (D), the third planetary gear (A3) rotating in the opposite direction to the first planetary gear (A1), the second gear set does not intervene in the transmission of motion; and if neither of the second or third crown wheels is blocked, they shall rotate freely without any motion being transmitted to the output shaft.

8. Continuous torque regulator, in accordance with claim 1, characterized in that the regulation system permits the operation of the pressure pump (Bp) to be made variable from being halted to turning freely, since the motion that reaches the shaft of the first planetary gear (A1) is transmitted to the first satellites (B1) and therefore to the frame (D), which if it offers resistance, the first satellites (B1) move the first crown wheel (C1) which in turn moves the pressure pump (Bp).

9. Continuous torque regulator, in accordance with claim 8, characterized in that moving a circular chamber of the control valve (Vc) toward a center permits less oil to pass and consequently the pressure pump (Bp) cannot impel as much oil and shall rotate more slowly and, with it, the first crown wheel (C1), the first satellites (B1) running round on the inside of the first crown wheel (C1) carrying with them the frame (D); the closer the circular chamber of the control valve (Vc) is brought to the center, the slower will the pressure pump (Bp) turn, and therefore the first crown wheel (C1), and on the contrary, the faster shall the frame (D) turn.

* * * * *

UNITED STATES PATENT AND TRADEMARK OFFICE
CERTIFICATE OF CORRECTION

PATENT NO. : 6,652,410 B2
DATED : November 25, 2003
INVENTOR(S) : Eduardo Gutierrez Vesga It is certified that error appears in the above-identified patent and that said Letters Patent is hereby corrected as shown below:

<u>Drawings,</u>
Sheet 5, FIG. 5 should be canceled and replaced with the following corrected FIG. 5:

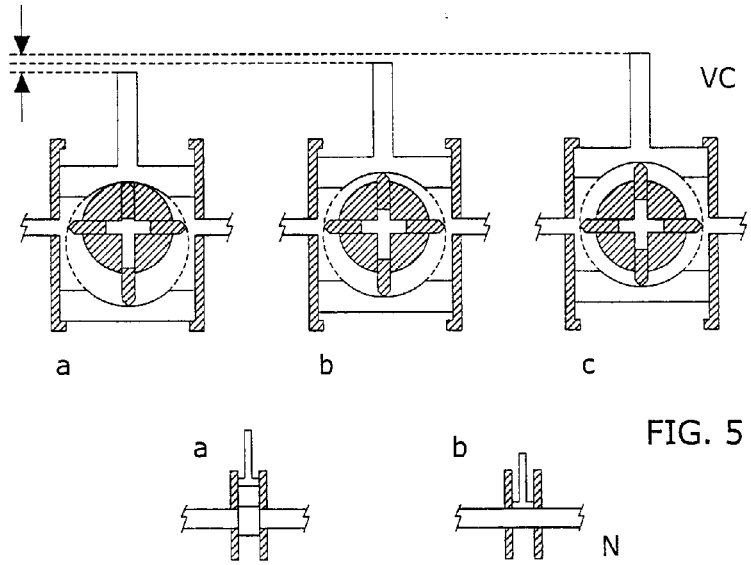

FIG. 5

Signed and Sealed this

Twentieth Day of April, 2004

JON W. DUDAS
*Acting Director of the United States Patent and Trademark Office*